United States Patent Office 3,351,490
Patented Nov. 7, 1967

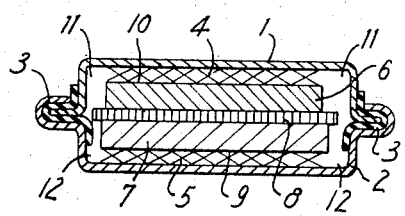
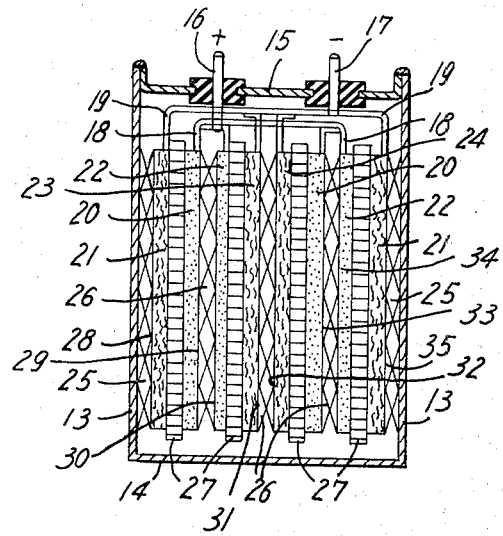
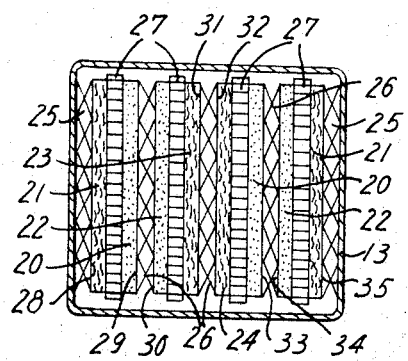
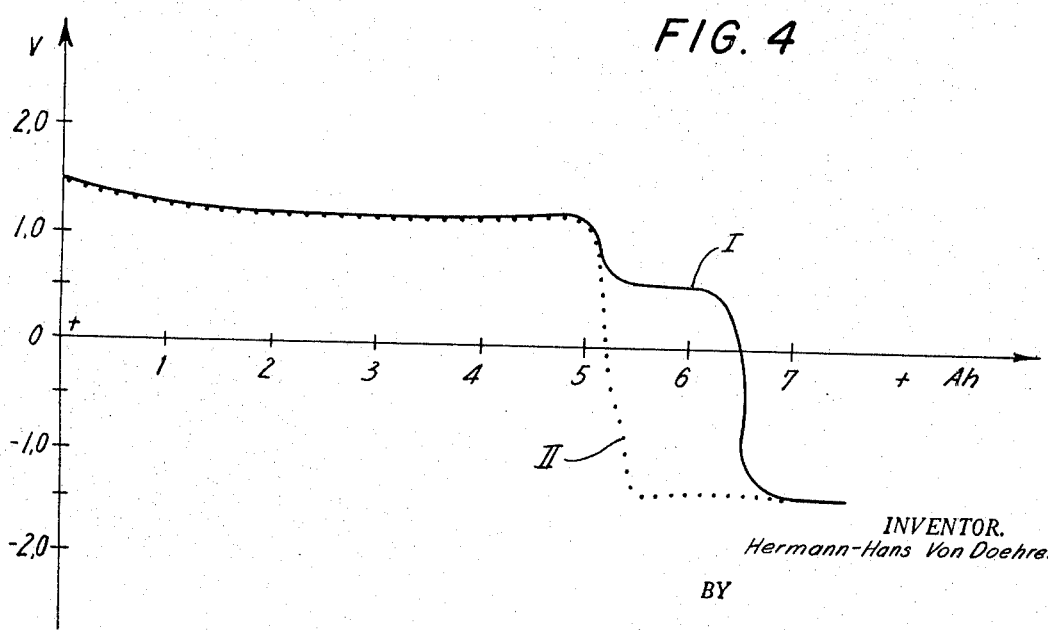

3,351,490
HERMETICALLY SEALED ALKALINE
STORAGE BATTERY
Hermann-Hans von Doehren, Frankfurt am Main, Germany, assignor to Varta Aktiengesellschaft, Frankfurt am Main, Germany
Continuation of application Ser. No. 41,441, July 7, 1960. This application Mar. 20, 1964, Ser. No. 354,500
5 Claims. (Cl. 136—6)

The present application is a continuation of my copending application Ser. No. 41,441, filed July 7, 1960, now abandoned, and entitled "Storage Battery."

The present invention relates to a storage battery and more particularly to a storage battery including a positive electrode of the composition described below.

More specifically, the invention is concerned with hermetically sealed storage batteries, preferably those with alkaline electrolyte such as are for instance described in U.S. Patent 2,798,110 U.S. Patent 2,842,607, British Patent No. 774,479, British Patent No. 774,478, British Patent No. 741,345, British Patent No. 769,784, British Patent No. 782,394 and with positive electrodes which may be of widely varying structure such as sintered electrodes, press electrodes, pocket electrodes, etc.

In order to increase the conductivity and to reduce the inner resistance of electric storage batteries, particularly of those containing an alkaline electrolyte, it is customary to admix to the regular positive active mass conductive materials such as graphite or nickel flakes. It is also possible to provide suitable electrically conductive sintered bodies, as carrier for the active mass of the positive electrode.

However, upon discharge of such battery cells, it is found that when the terminal voltage of the battery drops below one volt, i.e. at a potential at which only a very small and insignificant discharge capacity remains, further drop of the voltage is undesirably retarded. This intermediate voltage level seems to be caused by the formation of active oxygen during charging or operation of the battery and this phenomenon occurs in connection with all electrodes which cannot be electrochemically attacked. This intermediate voltage level is particularly marked in connection with graphite containing electrodes in which the graphite is oxidized to a considerable extent by the active oxygen formed during operation of the battery.

The length of time for which this intermediate voltage level is maintained depends primarily on the charging and discharging conditions, the length of time which elapsed since the last charging of the battery, the composition of the electrolyte and the size of the surface area of the conductive material in the electrode.

Particularly, with respect to hermetically sealed batteries which include safeguards against deep discharge with reversal of polarity, this intermediate voltage level is highly disadvantageous, since it complicates the proper proportioning of the capacities of the positive and negative electrodes due to the dependence of the same on the factors discussed in the preceding paragraph.

Due to the fact that it appears impossible and impractical to determine accurately the length for which this intermediate voltage level will be maintained in any given battery, the above-discussed phenomenon greatly complicates hermetically sealed battery arrangements in which excessive overpressure is to be avoided, since the point or moment at which reversal of polarity will occur cannot be predetermined with sufficient accuracy. As stated above, the reversal of polarity will depend to some extent on the length of time for which the intermediate voltage level is maintained and thus a somewhat indeterminable and variable factor has to be taken into account.

It is therefore an object of the present invention to overcome the above-discussed difficulties broadly and particularly with respect to hermetically sealed alkaline storage batteries, in which the active mass of the positive electrode contains current conducting flakes, sinter bodies or the like.

It is another object of the present invention to eliminate formation of the above discussed intermediate voltage level so that upon exhaustion of the active material of the positive electrode the terminal voltage will drop quickly without formation of an intermediate potential, to the potential of the electrode of opposite polarity, i.e. of the negative electrode and the potential of anti-polar mass if such anti-polar mass is included in the positive electrode.

Other objects and advantages of the present invention will become apparent from a further reading of the description and appended claims.

With the above and other objects in view the present invention contemplates in a storage battery, in combination, positive and negative electrodes, and an electrolyte in contact with the electrodes, the positive electrode including regular active mass having distributed therethrough an effective amount of at least one substance which is insoluble in the electrolyte and capable of alternating between a higher and a lower valency so as to form within the positive electrode an auxiliary redox system such that the oxygen potential relative to the auxiliary redox system is at least equal to the oxygen potential against the regular active mass of the positive electrode.

Thus, according to the present invention, the establishment of the intermediate potential or voltage level is prevented by distributing in the active mass of the positive electrode a substance which is insoluble in the electrolyte, for instance, in the alkaline electrolyte of the hermetically sealed alkaline storage battery, which substance can be easily changed from a lower to a higher valence and vice versa, so that the positive electrode will possess an additional redox potential against which the free oxygen potential will be at least equal to or greater than the oxygen potential against the regular active mass of the positive electrode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic cross-sectional view of a battery incorporating the present invention;

FIG. 2 is a schematic elevational cross-sectional view of another battery in accordance with the present invention;

FIG. 3 is a plan view in cross section of the battery illustrated in FIG. 2; and FIG. 4 illustrates the potential curve during discharge of a sealed alkaline storage battery with and without the addition of cerium hydroxide or the like in accordance with the present invention.

Referring now to the drawings and particularly to FIG. 1, the upper portion 1 and the lower portion 2 of the housing are shown, preferably made of metal. In the areas where housing portions 1 and 2 overlap each other an insulating intermediate layer 3 is provided, consisting of rubber or of a synthetic material such as a polyamide. The electrode pair 6 and 7 is arranged within the housing and separated by interposed separator 8. Advantageously, electrodes 6 and 7 as well as separator 8 are formed with fine pores. Separator 8 may also consist of a densely woven or otherwise produced fabric, or of a filter paper-like material made of natural or synthetic fibers, or of a semi-permeable foil of regenerated cellulose, of a microporous synthetic membrane or the like, or of a combination of several layers of the above materials. Electrodes 6 and 7 possess large surface areas which are in contact with the gas space within the battery. These areas are indicated in FIG. 1 by reference numerals 9 and 10 denoting opposite faces of electrodes 6 and 7, respectively, which serve for the electrochemical reaction of the gases. To maintain the electrode faces 9 and 10 spaced from the inner walls of housing portions 1 and 2, spaces 4 and 5 are provided formed as a framework with relatively large open intermediate spaces. It is necessary to maintain the electrodes spaced from the housing in order to provide sufficient contact area between the gases formed during the operation of the battery and the electrodes. Spaces 4 and 5 preferably consist of metal so as to form conductive connections between the respective electrodes and housing portions. At least one of spaces 4 and 5 possesses a certina degree of resiliency. No special connections to the terminals of the battery are needed due to the metallic spaces 4 and 5. The gas space includes in addition to the areas between electrode face 10 and housing portion 1, and electrode face 9 and housing portion 2, also the areas indicated by reference numerals 11 and 12, which, however, are of lesser size and effectiveness than the areas between the electrodes and the housing.

The battery illustrated in FIGS. 2 and 3 is basically constructed in a manner somewhat similar to the battery illustrated in FIG. 1.

Housing 13 is closed by bottom plate 14 and cover member 15. Elements 13, 14 and 15 are preferably made of metal. Terminals 16 and 17 penetrate through cover member 15 and are insulated against the same. Terminals 16 and 17 are in contact with the positive and negative electrodes within the cell by means of electrical conduits 18 and 19. Terminal 16 is thus connected with electrodes 20 and 22, and terminal 17 with electrodes 21, 23 and 24. Electrodes 20 and 22 form electrode pairs, respectively, and similarly electrodes 23 and 24 form pairs, while electrodes 21 outwardly delimit the set of electrode plates. Spaces 26 are located between electrodes 20 and 22, as well as between electrodes 23 and 24. Spaces 25 are provided between the walls of housing 13 and outermost electrodes 21. Spaces 25 and 26 preferably consist of metal and serve for electrically connecting the split positive and negative electrodes, respectively, as well as the housing. Due to the placing of spaces 25 and 26 between electrodes 20 and 22, 23 and 24, and between housing 13 and electrodes 21, a gas accessible area is formed within the battery. Thus, electrode faces 28, 29, 30, 31, 32, 33, 34 and 35 serve for electrochemically disposing of the gases formed during operation of the battery. These free electrode faces must be covered by a thin film of electrolyte. Between electrodes of opposite polarity such as between electrodes 21 and 20, 22 and 23, 24 and 20, and 20 and 22, separators 27 are arranged. In both illustrated batteries, the active mass of the positive electrode contains about 0.4% cerium hydroxide.

It must be noted that the batteries which are illustrated and discussed above are given by way of example only, the present invention not being limited to the specific structural arrangements of these batteries.

Referring now to FIG. 4 of the drawing, it will be seen that in a given conventional hermetically sealed alkaline storage battery, the voltage will drop upon discharge as indicated by full line I. After discharging about 5 ampere hours a first voltage drop occurs from about 1.5 to about 0.8 volt and a voltage of 0.8 volt or thereabouts is substantially maintained during further discharge to about 6.5 ampere hours. It is this intermediate voltage level which is harmful and which is prevented according to the present invention.

The voltage curve according to the present invention is indicated by dotted line II. It can be seen that the voltage drop upon discharge of about 5¼ ampere hours is sudden and, without forming an intermediate level, continues to the potential of the negative electrode, i.e. to the potential at which reversal of polarity might occur.

The intermediate potential of the active oxygen is thus avoided according to the present invention by the addition of about 0.4% by weight of cerium hydroxide to the active mass of the positive electrode.

Surprisingly, it has been found that the above discussed results are obtained by admixing to the active mass effective quantities, preferably between 0.01% and 10% of oxides or hydroxides of lanthanum or related elements preferably cerium, or oxides or hydroxides of the group III–B of the periodic table, i.e. gallium, indium or thallium.

As stated above, the quantity of the oxides or hydroxides forming the auxiliary redox system is preferably maintained between about 0.01% and 10% by weight of the active mass of the positive electrode. However, it has been found that in most cases the desired result can be safely obtained with quantities of between 0.5% and 1% by weight, i.e. the addition of between 0.5% and 1% by weight of oxides or hydroxides of lanthanum, cerium, gallium, indium or thallium has been found to be effective in preventing formation of the undesirable intermediate oxygen potential level. This is primarily so in connection with graphite-containing electrodes in which otherwise this intermediate potential is strongly developed. However, the exact amount of the additives such as cerium hydroxide or the like, depends also on the current density with which the electrode plates are charged.

Generally, it has been found that such materials may be used in accordance with the present invention as additives to the active mass of the positive electrode which can easily change at a high reaction speed from one valence to another. The effectiveness of these substances is primarily dependent on quick change of the valence, such as for instance can be accomplished in a system of $Ce^{IV}/Ce^{III}$-hydroxide in an alkaline electrolyte. Thereby, the formation of electrochemically active oxygen or peroxidic oxygen, will be prevented, whereby the cerium oxide or hydroxide or the like will act as an oxygen acceptor in the positive electrode. In order to act in this manner, the oxygen voltage or potential at these acceptor substances must be at least equal to or greater than the corresponding oxygen potential with respect to the regular active mass of the positive electrode.

The foregoing can be schematically represented as follows:

REDUCTION

OXIDATION

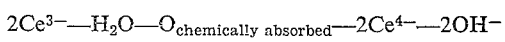

It is a further advantage that positive electrodes according to the present invention will speed up charging or formation of the electrodes since during such charging or formation processes, the auxiliary redox system described above will also serve to transmit electrochemically active oxygen. Particularly in the case of graphite-containing electrodes, the addition of substances forming the auxiliary redox system according to the present invention to the positive electrode will for all practical purposes prevent oxydation of the graphite to $CO_3$ ions.

The following examples are given as illustrative only, the present invention however not being limited to the specific details of the examples:

*Example I*

For producing a positive pocket electrode plate, one part by weight of cerium-(IV)-sulfate, $Ce(SO_4)_4 \cdot H_2O$, is dissolved in 10 parts by weight of distilled water. 4 parts by weight of graphite flakes are introduced in the thus formed solution and intimately mixed therewith. The thus formed paste is placed in a nickel dish and dried at about 105° C.

40 parts of 5% potassium hydroxide are now prepared and a quantity of hydrogen peroxide is added thereto sufficient to form a 1% alkaline hydrogen peroxide solution. The dried graphite cerium sulfate paste is now stirred into the thus formed alkaline solution and, thereby, a mixture of cerium$^{IV}$/cerium$^{III}$-hydroxide is precipitated. The precipitate is allowed to stand for about one hour in a precipitating solution and thereafter filtered and washed with distilled water until the spent wash water is free of sulfate and alkali. The filter cake is then thinly distributed in nickel dishes and again dried at 105° C. The thus obtained dry material which contains about 2% by weight of cerium$^{III}$/cerium$^{IV}$-hydroxide is then finely ground in a ball mill.

The thus pretreated graphite mass is then further processed in conventional manner into positive electrode plates as described in "Elektrochemie wässriger Lösungen" by F. Foerster, 3rd edition (J. A. Barthe, Leipzig), vol. I, 1922, page 267.

*Example II*

A positive nickel sinter plate according to the present invention may be produced as follows:

The nickel sinter plate is immersed in an aqueous solution containing between 0.5% and 1% of cerium-(IV)-sulfate so that the interstices of the sinter structure will be impregnated with the solution. The plate is then removed from the impregnating bath and dried at 105° C. Thereafter, the plate is immersed in a 5% aqueous potassium hydroxide solution containing 1% hydrogen peroxide. Thereby a mixture of cerium$^{III}$/cerium$^{IV}$-hydroxide is precipitated in the interstices of the sinter plate.

The thus prepared and still moist plates are then for some time cathodically polarized with a weak current in order to eliminate anions which may still be present in the plates. Thereafter, the plates are again dried at 105° C. and subsequently active mass is applied in conventional manner, as described in S. W. Vinal, Storage Batteries, 4th edition, New York, 1955, page 100.

Examples for individual active positive masses with specific auxiliary redox system:

| Mass No. | Redox system applied | Composition of active mass |
| --- | --- | --- |
| 1 | La$^{+++}$/La$^{++}$ | 71 w. percent Ni(OH)$_2$+20 w. percent Graphite+8.7 w. percent La(OH)$_3$. |
| 2 | Ce$^{++++}$/Ce$^{+++}$ | 78.33 w. percent Ni(OH)$_2$+21.3 w. percent Graphite+0.37 w. percent CeO$_2$ |
| 3 | Ga$^{+++}$/Ga$^{++}$ | 76.3 w. percent Ni(OH)$_2$+19.4 w. percent Graphite+4.3 percent Ga(OH)$_3$. |
| 4 | Jn$^{+++}$/Jn$^{++}$ | 78.2 w. percent Ni(OH)$_2$+20.4 w. percent Graphite+1.4 percent In(OH)$_3$. |
| 5 | Tl$^{+++}$/Tl$^{++}$ | 80.7 w. percent Ni(OH)$_2$+18.9 w. percent Graphite+0.25 w. percent Tl(OH)$_3$+0.15% w. percent Tl(OH). |
| 6 | Ce$^{++++}$Ce$^{+++}$ Tl$^{+++}$/Tl$^+$ | 78.6 w. percent Ni(OH)$_2$+19.96 w. percent Graphite+ 0.16 w. percent Tl(OH)$_3$. +0.04 w. percent Tl(OH). +0.24 w. percent CeO$_2$ |

It will be understood that each of the elements described above, or two or more together, may also find a useful application in other types of batteries differing from the type described above.

While the invention has been illustrated and described as embodied in the positive electrode of a hermetically sealed alkaline storage battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hermetically sealed alkaline storage battery, in combination, positive and negative electrodes; and an alkaline electrolyte in contact with said electrodes, said positive electrode including a major proportion of nickel oxide and a minor proportion of a current conducting material selected from the group consisting of nickel and graphite and having distributed therethrough between 0.01% and 2% by weight of said active mass of at least one substance selected from the group consisting of oxides and hydroxides of lanthanum, cerium, gallium, indium and thallium and which is insoluble in said electrolyte and capable of alternating between a higher and a lower valency so as to form within said positive electrode an auxiliary redox system such that the oxygen potential relative to said auxiliary redox system is at least equal to the oxygen potential of said nickel oxide of said positive electrode.

2. In a hermetically sealed alkaline storage battery, in combination, positive and negative electrodes; and an alkaline electrolyte in contact with said electrodes, said positive electrode including a major portion of nickel oxide and a minor proportion of a current conducting material selected from the group consisting of nickel and graphite and having distributed therethrough between 0.01% and 1% by weight of said active mass of at least one substance selected from the group consisting of oxides and hydroxides of lanthanum, cerium, gallium, indium and thallium and which is insoluble in said electrolyte and capable of alternating between a higher and a lower valency so as to form within said positive electrode an auxiliary redox system such that the oxygen potential relative to said auxiliary redox system is at least equal to the oxygen potential of said nickel oxide of said positive electrode.

3. In a hermetically sealed alkaline storage battery, in combination, positive and negative electrodes; and an alkaline electrolyte in contact with said electrodes, said positive electrode including a major proportion of nickel oxide and a minor proportion of a current conducting material selected from the group consisting of nickel and graphite and having distributed therethrough between 0.5% and 1% by weight of said active mass of at least one substance selected from the group consisting of oxides and hydroxides of lanthanum, cerium, gallium, indium and thallium and which is insoluble in said electrolyte and capable of alternating between a higher and a lower valency so as to form within said positive electrode an auxiliary redox system such that the oxygen potential relative to said auxiliary redox system is at least equal to the oxygen potential of said nickel oxide of said positive electrode.

4. In a hermetically sealed storage battery including an alkaline electrolyte, the improvement in combination therewith comprising a positive electrode in contact with said alkaline electrolyte and including a major proportion of nickel oxide and a minor proportion of a current conducting material selected from the group consisting of nickel and graphite and having distributed therethrough at least one substance being selected from the group consisting of oxides and hydroxides of lanthanum, cerium, gallium, indium and thallium, said substance being insoluble in said electrolyte and present in a quantity equal to between 0.01% and 1% of the weight of said nickel oxide.

5. In a hermetically sealed alkaline storage battery, in combination, positive and negative electrodes; and an alkaline electrolyte in contact with said electrodes, said positive electrode including a major proportion of nickel oxide and a minor proportion of a current conducting material selected from the group consisting of nickel and graphite and having distributed therethrough cerium hydroxide in a quantity equal to about 0.4% by weight of said nickel oxide of said positive electrode, said cerium hydroxide being insoluble in said alkaline electrolyte.

References Cited

UNITED STATES PATENTS 1,167,485   1/1916   Edison.
2,980,747   4/1961   Daley _____ 136—6

WINSTON A. DOUGLAS, *Primary Examiner.*

B. OHLENDORF, A. SKAPARS, *Assistant Examiners.*